Aug. 24, 1926.                                                         1,597,065
                          O. C. DAVIS
                        FOLDING BERRY BOX
                      Filed April 9, 1926        2 Sheets-Sheet 1

Orin C. Davis  Inventor
By C.A.Snow & Co.
               Attorneys

Aug. 24, 1926.
O. C. DAVIS
1,597,065
FOLDING BERRY BOX
Filed April 9, 1926 2 Sheets-Sheet 2
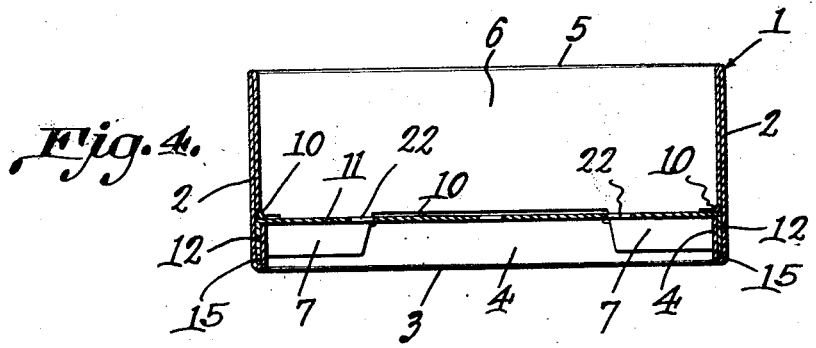
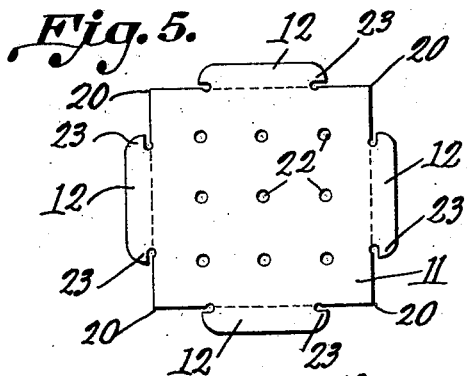
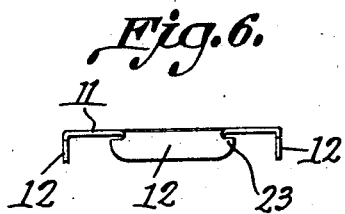
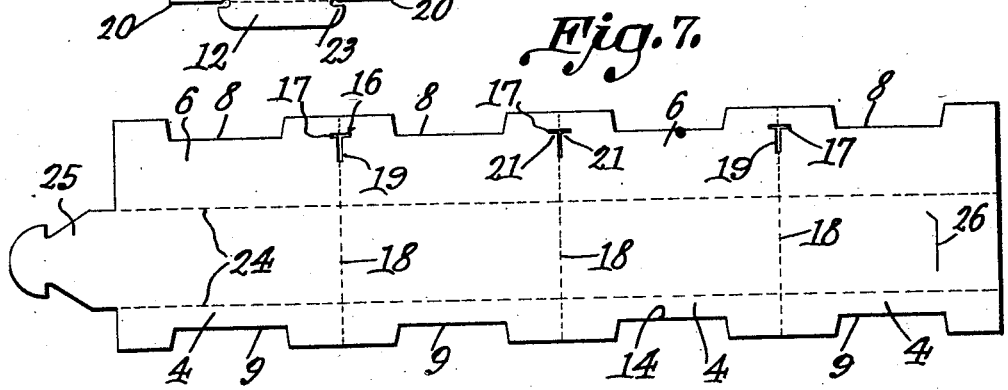
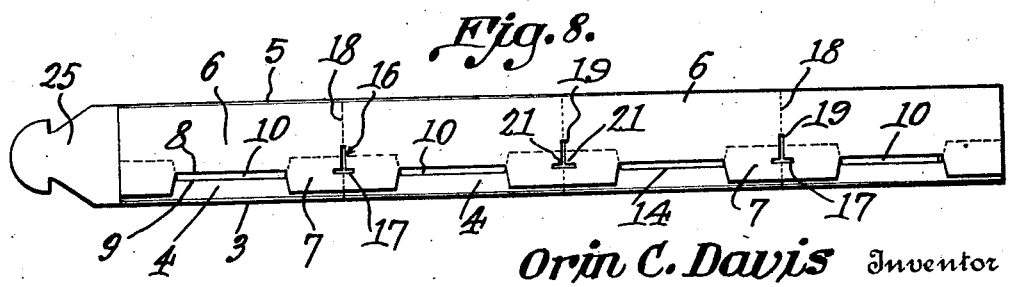
Orin C. Davis Inventor
By C. A. Snow & Co.
Attorneys Patented Aug. 24, 1926.

1,597,065

UNITED STATES PATENT OFFICE.

ORIN C. DAVIS, OF MANISTEE, MICHIGAN, ASSIGNOR OF ONE-HALF TO PHILLIP P. SCHNORBACH, OF MANISTEE, MICHIGAN.

FOLDING BERRY BOX.

Application filed April 9, 1926. Serial No. 100,933.

This invention aims to provide a box which can be fashioned cheaply out of light material, the box having the necessary strength, owing to the way in which the light material is folded upon itself to reinforce the box. Another object of the invention is to provide novel means for holding the bottom of the box detachably assembled with the frame of the box.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed it being understood that changes in the precise embodiment of the invention herein disclosed, may be made within the scope of what is claimed, without departing from the spirit of the invention.

In the drawings:—

Figure 4 is a section on the line 4—4 of Figure 2;

Figure 5 is a plan showing the bottom of the box;

Figure 6 is a side elevation of the bottom of the box;

Figure 7 is a plan disclosing the blank out of which the frame of the box is formed;

Figure 8 is an elevation showing the frame partly folded.

Figure 3:
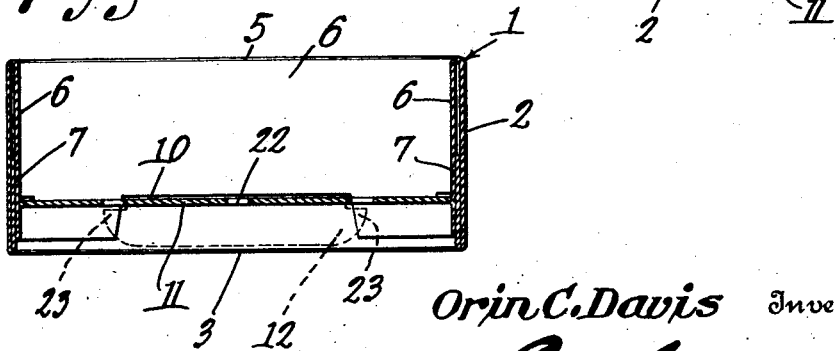
Figure 3 is a cross section on the line 3—3 of Figure 2.

The box forming the subject matter of this application is made out of any bendable material, such as card board, and in this connection it is to be observed that, owing to the particular nature of the box, comparatively light stock may be used. The box includes a frame which is denoted generally by the numeral 1 and is of rectangular outline. The frame may be of any desired height. The frame includes an outer wall 2. The outer wall 2 is provided along its lower edge with an upstanding internal flange 4, the lower edge of the frame being marked by the numeral 3. The frame 1 is supplied along its upper edge 5 with a depending internal flange 6. The flanges 4 and 6 are overlapped upon each other, as denoted by the numeral 7, and as shown best in Figure 3, the flange 4 extending between the flange 6 and the outer wall 2. The overlapped portions of the flanges 4 and 6 are provided in their edges with notches which cooperate to define slots 10, the notches in the flange 6 being designated by the numeral 8, and the notches in the flange 4 being designated by the numeral 9.

Within the frame 1 thus formed is located a removable bottom 11 provided with depending wings 12. The wings 12 extend across the upstanding flange 4, at the bases 14 of the notches 9 in the said flange, thereby to support the bottom, the wings extending through the slots 10, and downwardly, as at 15, between the lower or upstanding flange 4 and the outer wall 2 of the frame 1.

The flange 6 has T-shaped slits 16, the heads 17 of which extend across the lines 18 at the corners of the frame, the bodies 19 of the T-shaped slits 16, extending along the said lines 18. The bottom 11 has angles 20 which are received in the transverse heads 17 of the slits 16. Owing to the fact that the slits 16 include the bodies 19, the box frame may be folded the more readily along the lines 18, and, moreover, free corners 21 are formed, which facilitate the entrance of the angles 20 of the bottom 11 into the heads 17 of the T-shaped slots 16.

The bottom 11 may be perforated as at 22, and the wings 12 may have projections or hooks 23 at their ends, the hooks or projections enhancing the hold of the wings 12 on the frame 1 of the box.

Figure 1:
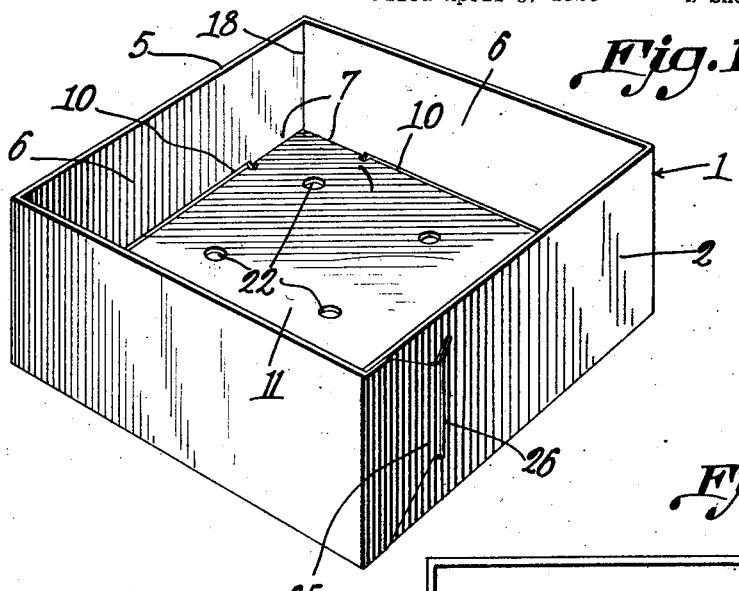
Figure 1 shows in perspective, a box constructed in accordance with the invention.
Figure 2:
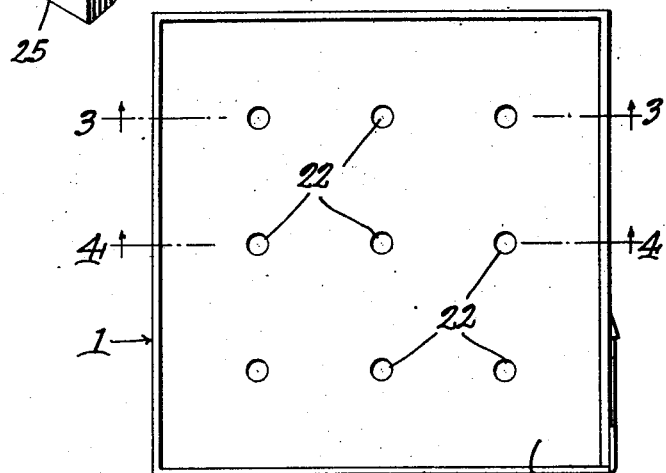
Figure 2 is a top plan of the box.

The general procedure in fastening the frame 1 of the box will be understood readily when Figure 7 is noted. The blank shown in Figure 7 is folded along two longitudinal lines 24, and then along the lines 18, that part of the frame which has been denominated the outer wall 2 being supplied with an arrow head tongue 25 which is received in a slit 26 to hold the frame in the rectangular form shown in Figure 1, it being noted that when the bottom 11 is in place, the bottom also exercises an important function in holding the frame in the form depicted in Figures 1 and 2.

The general construction of the device is such that it may be made cheaply out of light material and at the same time will have the necessary strength.

What is claimed is:—

1. A box comprising a frame including an outer wall provided along its lower edge with an upstanding internal flange and provided along its upper edge with a depending internal flange, the flanges being overlapped upon each other, the overlapped portions of the flanges being provided in their edges with cooperating notches which define slots, and a bottom within the frame and provided with depending wings extended across the upstanding flange at the bases of the notches in said flange, thereby to support the bottom, and extended through the slots and downwardly between the upstanding flange and the outer wall.

2. A box constructed as set forth in claim 1, and further characterized by the fact that one of the flanges has transverse slits alined with the slots and extended across the lines that form the corners of the frame, the bottom having angles which are received in the slits.

3. A box constructed as set forth in claim 1, and further characterized by the fact that one of the flanges has inverted T-shaped slits the heads of which extend across the lines that form the corners of the frame, the bodies of the T-shaped slits extending along said lines, and the bottom having angles which are received in the heads of the slits.

In testimony that I claim the foregoing as my own, I have hereto affixed my signature.

ORIN C. DAVIS.